US011533652B2

(12) United States Patent
Jiang

(10) Patent No.: US 11,533,652 B2
(45) Date of Patent: Dec. 20, 2022

(54) METHOD AND DEVICE FOR CONFIGURING REFLECTIVE QUALITY OF SERVICE, AND METHOD AND DEVICE FOR TRANSMITTING INFORMATION

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 39 days.

(21) Appl. No.: 16/792,865

(22) Filed: Feb. 17, 2020

(65) Prior Publication Data

US 2020/0187044 A1 Jun. 11, 2020

Related U.S. Application Data

(63) Continuation of application No. PCT/CN2017/098091, filed on Aug. 18, 2017.

(51) Int. Cl.
*H04W 28/02* (2009.01)
*H04W 76/20* (2018.01)

(52) U.S. Cl.
CPC ..... *H04W 28/0268* (2013.01); *H04W 28/0263* (2013.01); *H04W 76/20* (2018.02)

(58) Field of Classification Search
None
See application file for complete search history.

(56) References Cited

U.S. PATENT DOCUMENTS

| 2018/0083688 A1* | 3/2018 | Agiwal | H04M 3/42229 |
| 2019/0028920 A1* | 1/2019 | Pan | H04L 47/24 |
| 2019/0029057 A1* | 1/2019 | Pan | H04W 28/12 |
| 2020/0008118 A1* | 1/2020 | Han | H04W 76/11 |

(Continued)

FOREIGN PATENT DOCUMENTS

| CN | 1893402 A | 1/2007 |
| CN | 105101293 A | 11/2015 |

OTHER PUBLICATIONS

Jin, Method And Apparatus For Reconfiguration According to Changing of PDCP Version in Next Communication System, Oct. 2017-0101945, all pages. (Year: 2017).*

(Continued)

*Primary Examiner* — Gregory B Sefcheck
*Assistant Examiner* — Srinivasa R Reddivalam
(74) *Attorney, Agent, or Firm* — Syncoda LLC; Feng Ma

(57) ABSTRACT

A method for configuring reflective QoS includes: first indication information transmitted from a Service Data Adaptation Protocol (SDAP) transmitting end is received, the first indication information being configured to indicate a Sequence Number (SN) of a Packet Data Convergence Protocol (PDCP) packet corresponding to a first SDAP packet transmitted according to a new configuration of a pre-established Data Radio Bearer (DRB) or an SN of a PDCP packet corresponding to a last SDAP packet transmitted according to an previous configuration of the pre-established DRB; an SN of a PDCP packet corresponding to a received SDAP packet is acquired; and the acquired SN is compared with the SN indicated by the first indication information to determine whether the SDAP packet includes an SDAP header.

12 Claims, 13 Drawing Sheets

(56) References Cited

U.S. PATENT DOCUMENTS

2020/0059817 A1* 2/2020 Baek ............... H04W 28/04
2020/0221526 A1* 7/2020 Jin .................. H04W 36/08
2020/0229023 A1* 7/2020 Ke ................... H04W 72/087
2021/0168882 A1* 6/2021 Chang .............. H04W 76/11

OTHER PUBLICATIONS

Mediatek Inc. SDAP Header Design for Reflective QoS Indication and QoS Flow Remapping. R2-1708260. Aug. 12, 2017 (Aug. 12, 2017), sections 2 and 5.
Qualcomm Incorporated. Further Consideration of SDAP Header. R2-1706798. Jun. 29, 2017 (Jun. 29, 2017), entire document.
International Search Report in the international application No. PCT/CN2017/098091, dated Apr. 27, 2018.
English translation of the Written Opinion of the International Search Authority in the international application No. PCT/CN2017/098091, dated Apr. 27, 2018.
Huawei, HiSilicon "QoS Flow to DRB Re-Mapping" 3GPP TSG-RAN WG2#99 Meeting, R2-1708938, Berlin, Germany, Aug. 21-25, 2017.
SDAP PDU format "Qualcomm Incorporated"3GPP TSG-RAN WG2 Meeting #99, R2-1708945, Berlin, Germany, Jul. 21-25, 2017.
Huawei "Data forwarding with QoS flow relocation" 3GPP TSG-RAN3 Meeting #95bis, R3-171072, Spokane, Washington, USA, Apr. 3-7, 2017.
Notice of Allowance of the Chinese application No. 201780001451. 9, dated Oct. 11, 2021.

* cited by examiner

METHOD AND DEVICE FOR CONFIGURING REFLECTIVE QUALITY OF SERVICE, AND METHOD AND DEVICE FOR TRANSMITTING INFORMATION

CROSS-REFERENCE TO RELATED APPLICATION

This is a continuation of International application No. PCT/CN2017/098091 filed on Aug. 18, 2017, the disclosure of which is hereby incorporated by reference in its entirety.

BACKGROUND

Along with development of communication technologies, 5th Generation (5G) has emerged. A new protocol layer above an existing Packet Data Convergence Protocol (PDCP) layer is introduced into a user plane of 5G New Radio (NR).

For convenient description, the newly introduced protocol layer is referred to as a Service Data Adaptation Protocol (SDAP) layer. The SDAP layer is a layer above the PDCP layer, and is responsible for mapping an upper-layer QoS flow to a certain Data Radio Bearer (DRB), and a Protocol Data Unit (PDU) of the SDAP layer is a Service Data Unit (SDU) of the PDCP layer. A protocol stack architecture added with the SDAP layer is shown in FIG. 1.

The SDAP layer may include multiple PDU sessions, each PDU session corresponds to one SDAP entity, one PDU session includes multiple QoS flows, and respective QoS flows may be mapped to different DRBs. The QoS flows of different PDU sessions may not be mapped to one same DRB. An Uplink (UL) SDAP requires addition of a QoS flow Identifier (ID) to a UL packet such that a Radio Access Network (RAN) may transmit the UL packet to a corresponding Core Network (CN) QoS transmission channel. A Downlink (DL) SDAP requires addition of a QoS flow ID to a DL packet such that UE may determine a DRB that the UL packet is mapped to for reflective QoS.

Reflective QoS includes Non-Access Stratum (NAS) reflective QoS and Access Stratum (AS) reflective QoS. For the NAS reflective QoS, since a NAS is responsible for mapping a Service Data Flow (SDF) to a QoS flow, if a QoS flow that a UL of an SDF is mapped to is consistent with a QoS flow that a DL is mapped to, the SDF adopts reflective QoS. The AS reflective QoS is like the NAS reflective QoS. An AS is responsible for mapping a QoS flow to a DRB. If a DRB that a UL of a QoS flow is mapped to is consistent with a DRB that a DL is mapped to, the QoS flow adopts reflective QoS. The NAS reflective QoS and the AS reflective QoS are independently configured.

At present, the 3rd Generation Partnership Project (3GPP) has agreed that whether data of one DRB includes an SDAP header may be configured. The following scenarios are mainly considered. A first scenario: if all of data mapped to DRB does not support QoS-flow-level QoS management, there is no need to add an SDAP header to both UL data and DL data. A second scenario: if it is not known whether a QoS flow mapped to DRB adopts NAS reflective QoS or AS reflective QoS, there is no need for DL data to contain an SDAP header. Specific conditions under which UL data may contain no SDAP header have not yet been determined at present.

SUMMARY

The present disclosure relates generally to the technical field of communication, and more specifically to a method and device for configuring reflective Quality of Service (QoS), a method and device for transmitting information, User Equipment (UE), a base station, and a computer-readable storage medium.

According to a first aspect of embodiments of the present disclosure, a method for configuring reflective QoS is provided, which may be applied to an SDAP receiving end, the method including: first indication information transmitted from an SDAP transmitting end is received, the first indication information being configured to indicate a Sequence Number (SN), and the SN including an SN of a PDCP packet corresponding to a first SDAP packet transmitted from the SDAP transmitting end according to a new configuration of a pre-established DRB or an SN of a PDCP packet corresponding to a last SDAP packet transmitted from the SDAP transmitting end according to an previous configuration of the pre-established DRB; an SN of a PDCP layer corresponding to a received SDAP packet is acquired; and the acquired SN is compared with the SN indicated by the first indication information to determine whether the SDAP packet includes an SDAP header.

According to a second aspect of the embodiments of the present disclosure, a method for transmitting information is provided, which may be applied to an SDAP transmitting end, the method including: it is determined to perform reconfiguration as to whether a pre-established DRB includes an SDAP header; and first indication information is transmitted to an SDAP receiving end, the first indication information being configured to indicate an SN, and the SN including an SN of a PDCP packet corresponding to a first SDAP packet transmitted from the SDAP transmitting end according to a new configuration of the DRB or an SN of a PDCP packet corresponding to a last SDAP packet transmitted from the SDAP transmitting end according to an previous configuration of the DRB, for the SDAP receiving end to determine whether a received SDAP packet includes an SDAP header.

According to a third aspect of embodiments of the present disclosure, a device for configuring reflective QoS is provided, which may be applied to an SDAP receiving end, the device including: a memory storing processor-executable instructions; and a processor arranged to execute the stored processor-executable instructions to perform operations of: receiving first indication information transmitted from an SDAP transmitting end, the first indication information being configured to indicate an SN, and the SN including an SN of a PDCP packet corresponding to a first SDAP packet transmitted from the SDAP transmitting end according to a new configuration of a pre-established DRB or an SN of a PDCP packet corresponding to a last SDAP packet transmitted from the SDAP transmitting end according to an previous configuration of the pre-established DRB; acquiring an SN of a PDCP packet corresponding to a received SDAP packet; and comparing the acquired SN and the SN indicated by the first indication information to determine whether the SDAP packet includes an SDAP header.

According to a fourth aspect of the embodiments of the present disclosure, a device for transmitting information is provided, which may be applied to an SDAP transmitting end, the device including: a memory storing processor-executable instructions; and a processor arranged to execute the stored processor-executable instructions to perform operations of: determining to perform reconfiguration as to whether a pre-established DRB includes an SDAP header; and transmitting first indication information to an SDAP receiving end, the first indication information being configured to indicate an SN, and the SN including an SN of a PDCP packet corresponding to a first SDAP packet transmitted from the SDAP transmitting end according to a new configuration of the DRB or an SN of a PDCP packet corresponding to a last SDAP packet transmitted from the SDAP transmitting end according to an previous configuration of the DRB, for the SDAP receiving end to determine whether a received SDAP packet includes an SDAP header.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The inventors of the present disclosure have recognized that, when reconfiguration is performed as to whether a DRB includes any SDAP header after the DRB is configured to include or not include an SDAP header, an previous SDAP header configuration may be continued to be adopted for SDAP data that has been submitted to a PDCP layer by an SDAP transmitting end, and a new configuration may be adopted for data that has not yet been submitted to the PDCP layer; thus an SDAP receiving end may simultaneously receive the SDAP data adopting the previous configuration and the SDAP data adopting the new configuration, and may not distinguish between these two types of SDAP data adopting different configurations.

A solution can include containing a bit in a header of a PDCP packet encapsulated with an SDAP packet to indicate whether the SDAP packet in the PDCP packet includes an SDAP header. However, according to this solution, a design principle of loose coupling between layers is broken; and each PDCP packet is required to contain an additional bit, so that a header overhead is increased.

Figure 1:
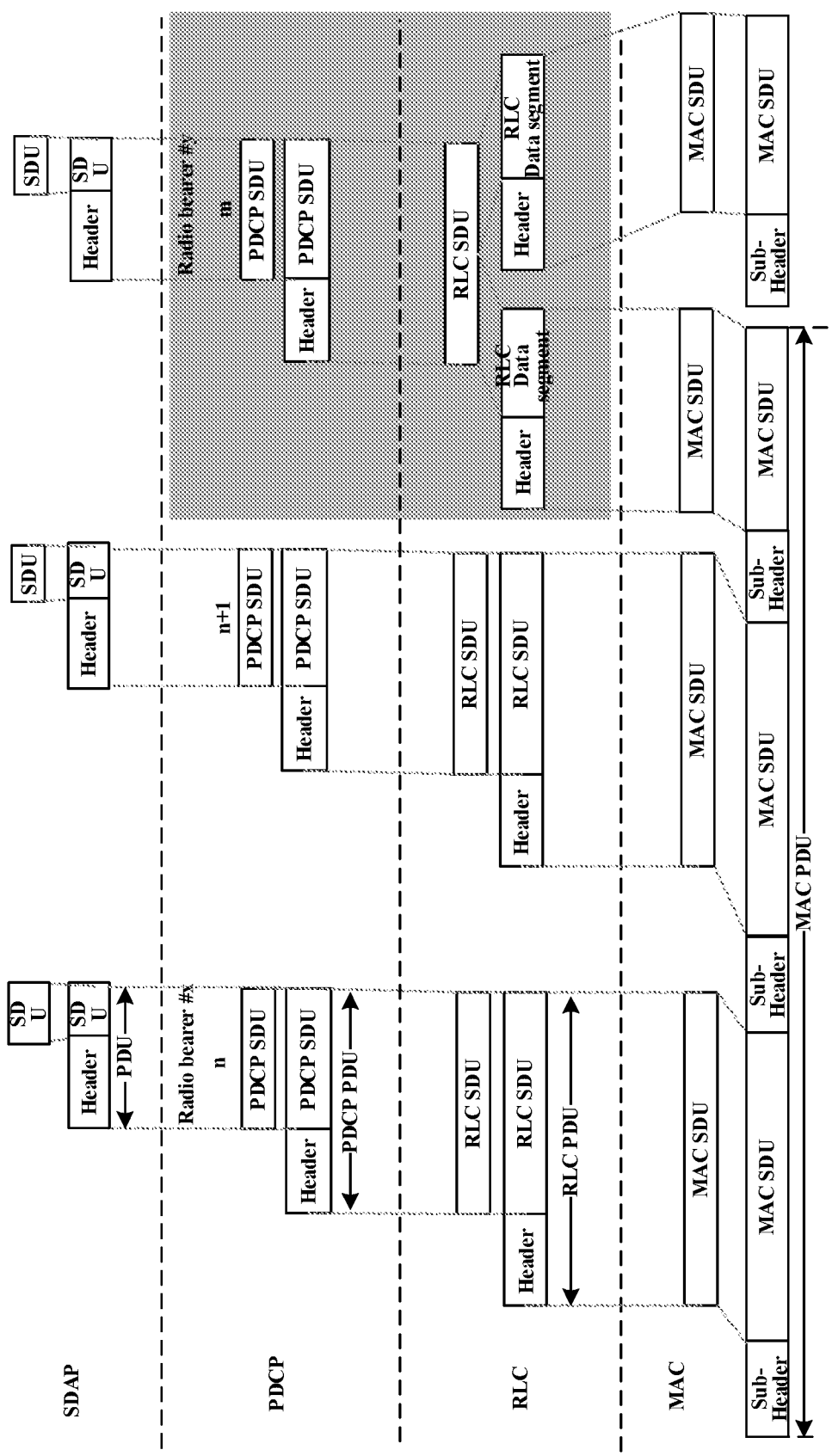
FIG. 1 is a diagram of a protocol stack architecture added with an SDAP layer, according to an exemplary embodiment of the present application.
Figure 2:
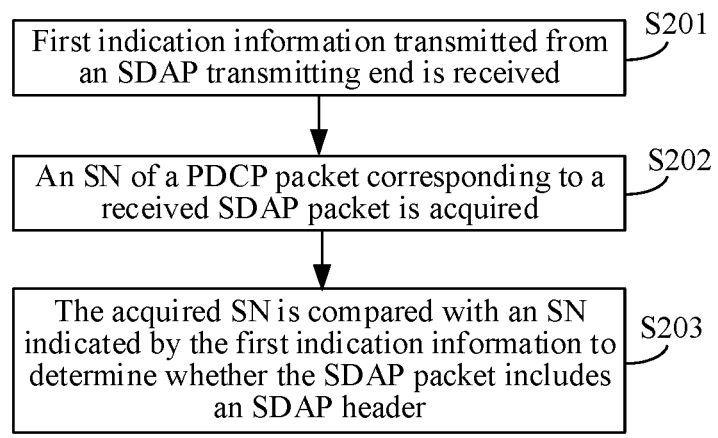
FIG. 2 is a flowchart showing a method for configuring reflective QoS, according to an exemplary embodiment of the present application.

FIG. 2 is a flowchart showing a method for configuring reflective QoS, according to an exemplary embodiment of the present application. The embodiment is described from an SDAP receiving end. As shown in FIG. 2, the method for configuring reflective QoS includes the following steps.

In S201, first indication information transmitted from an SDAP transmitting end, the first indication information being configured to indicate an SN, and the SN including an SN of a PDCP packet corresponding to a first SDAP packet transmitted from the SDAP transmitting end according to a new configuration of a pre-established DRB or an SN of a PDCP packet corresponding to a last SDAP packet transmitted from the SDAP transmitting end according to a previous configuration of the pre-established DRB.

The SDAP receiving end may be UE and may also be a base station. Correspondingly, the SDAP transmitting end may be a base station and may also be UE. The new configuration of the DRB refers to whether the DRB includes the SDAP header. For example, if the previous configuration of the DRB is that the DRB does not include the SDAP header, the new configuration of the DRB is that the DRB includes the SDAP header. Similarly, if the previous configuration of the DRB is that the DRB includes the SDAP header, the new configuration of the DRB is that the DRB does not include the SDAP header.

In the embodiment, when the SDAP receiving end is the UE, the SDAP transmitting end is the base station, and the first indication information may be contained in an RRC connection reconfiguration message, another RRC message or MAC CE transmitted from the base station. When the SDAP receiving end is the base station, the SDAP transmitting end is the UE, and the first indication information may be contained in an RRC connection reconfiguration complete message, another RRC message or MAC CE transmitted from the UE.

In S202, an SN of a PDCP layer corresponding to a received SDAP packet is acquired.

If the SDAP receiving end is the UE, a PDCP layer of the UE, when receiving the PDCP packet, acquires the SN from a header of the PDCP packet and submits the SDAP packet and the SN of the corresponding PDCP packet to an SDAP layer. Therefore, the UE may acquire the SN of the PDCP packet corresponding to the received SDAP packet.

In S203, the acquired SN is compared with the SN indicated by the first indication information to determine whether the SDAP packet includes an SDAP header.

For example, the SN, indicated by the first indication information, of the PDCP packet corresponding to the first SDAP packet transmitted according to the new configuration of the DRB is 15; if the acquired SN of the PDCP packet corresponding to the SDAP packet is 14, it is determined that the received SDAP packet is transmitted according to the previous configuration of the DRB; if the previous configuration of the DRB is that the SDAP header is not included, it is determined that the corresponding SDAP packet does not include the SDAP header; and if the previous configuration of the DRB is that the SDAP header is included, it is determined that the corresponding SDAP packet includes the SDAP header.

For another example, the SN, indicated by the first indication information, of the PDCP packet corresponding to the first SDAP packet transmitted according to the new configuration of the DRB is 15; if the acquired SN of the PDCP packet corresponding to the SDAP packet is 17, it is determined that the received SDAP packet is transmitted according to the new configuration of the DRB; if the new configuration of the DRB is that the SDAP header is not included, it is determined that the corresponding SDAP packet does not include the SDAP header; and if the new configuration of the DRB is that the SDAP header is included, it is determined that the corresponding SDAP packet includes the SDAP header.

According to the embodiment, the first indication information configured to indicate the SN of the PDCP packet corresponding to the first SDAP packet transmitted according to the new configuration of the pre-established DRB or the SN of the PDCP packet corresponding to the last SDAP packet transmitted according to the previous configuration of the pre-established DRB is received from the SDAP transmitting end, the SN of the PDCP packet corresponding to the received SDAP packet is acquired, and then the acquired SN is compared with the SN indicated by the first indication information, so that whether the SDAP packet includes the SDAP header may be determined. In this implementation manner, the header is not required to contain any additional bit, and thus the header has low overheads.

Figure 3:
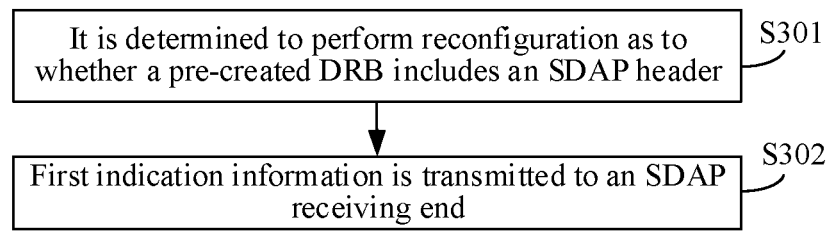
FIG. 3 is a flowchart showing a method for transmitting information, according to an exemplary embodiment of the present application.

FIG. 3 is a flowchart showing a method for transmitting information, according to an exemplary embodiment of the present application. The embodiment is described from an SDAP transmitting end. As shown in FIG. 3, the method for transmitting information includes the following steps.

In S301, it is determined to perform reconfiguration as to whether a pre-established DRB includes an SDAP header.

The SDAP receiving end may be UE and may also be a base station. Correspondingly, the SDAP transmitting end may be a base station and may also be UE.

When the SDAP transmitting end is the base station, if an RRC connection reconfiguration message transmitted from the base station contains an indication of reconfiguring DL data of the DRB, it may be determined to perform reconfiguration as to whether the pre-established DRB includes the SDAP header.

When the SDAP transmitting end is the UE, if an RRC connection reconfiguration message transmitted from the base station contains an indication of reconfiguring UL data of the DRB, it may be determined to perform reconfiguration as to whether the pre-established DRB includes the SDAP header.

In S302, first indication information is transmitted to an SDAP receiving end, the first indication information being configured to indicate an SN, and the SN including an SN of a PDCP packet corresponding to a first SDAP packet transmitted from an SDAP transmitting end according to a new configuration of the DRB or an SN of a PDCP packet corresponding to a last SDAP packet transmitted from the SDAP transmitting end according to an previous configuration of the DRB, for the SDAP receiving end to determine whether a received SDAP packet includes an SDAP header.

In the embodiment, when the SDAP transmitting end is the base station, the SDAP receiving end is the UE, and the first indication information may be contained in an RRC connection reconfiguration message, another RRC message or MAC CE transmitted from the base station. When the SDAP transmitting end is the UE, the SDAP receiving end is the base station, and the first indication information may be contained in an RRC connection reconfiguration complete message, another RRC message or MAC CE transmitted from the UE.

According to the embodiment, it is determined to perform reconfiguration as to whether the pre-established DRB includes the SDAP header, and the first indication information is transmitted to the SDAP receiving end, so that the UE may determine whether the SDAP packet includes the SDAP header according to the first indication information. In the implementation manner, the header is not required to contain any additional bit, and thus the header has low overheads.

Figure 4:
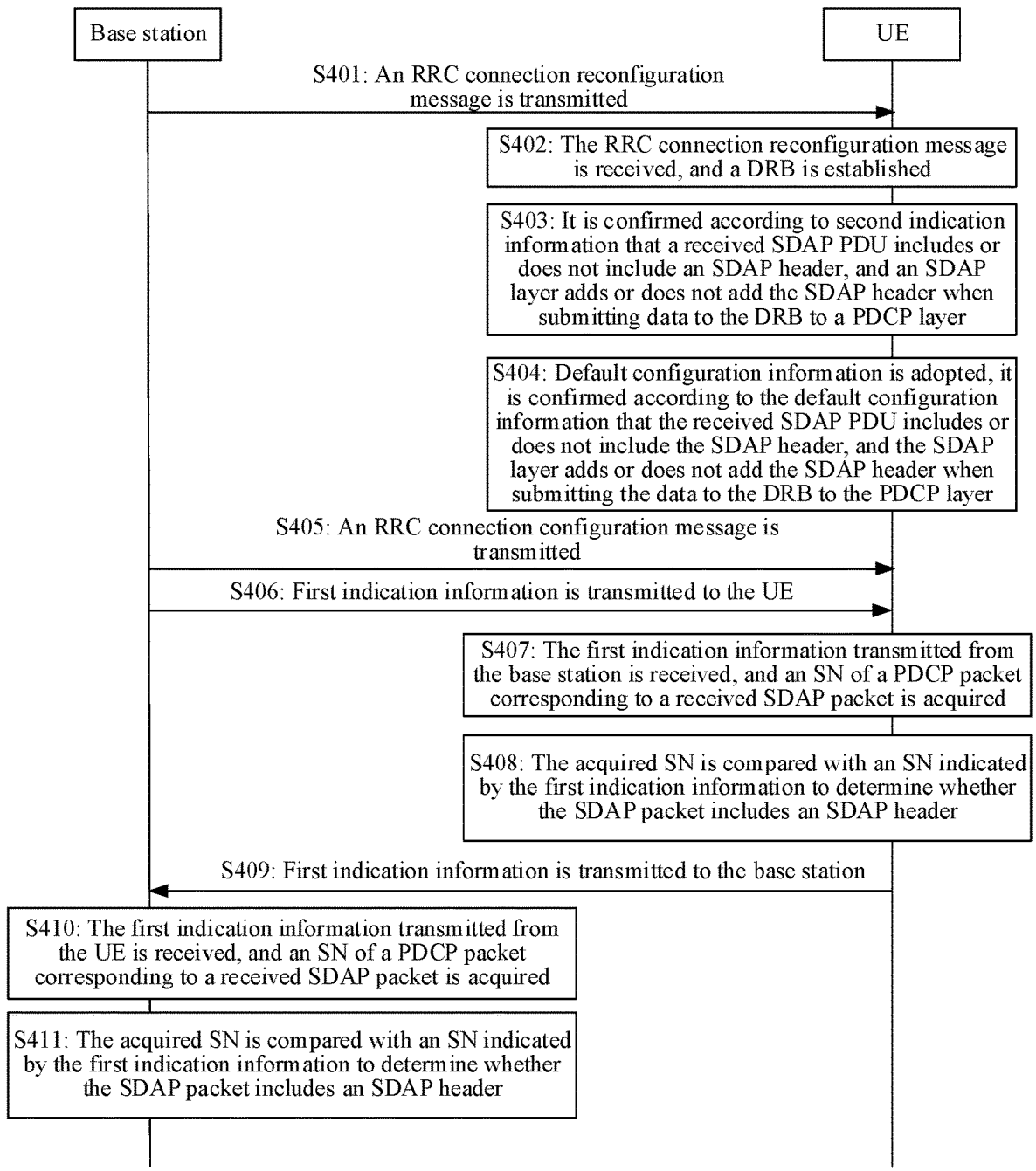
FIG. 4 is a signaling flowchart showing a method for configuring reflective QoS, according to an exemplary embodiment of the present application.

For describing an interaction process of the SDAP transmitting end and the SDAP receiving end more clearly, descriptions will be made below with FIG. 4 as an example. When the SDAP transmitting end is the UE, the SDAP receiving end is the base station, and when the SDAP transmitting end is the base station, the SDAP receiving end is the UE. Therefore, the interaction process of the SDAP transmitting end and the SDAP receiving end is an interaction process of UE and a base station. As shown in FIG. 4, the method for configuring reflective QoS includes the following steps.

In S401, the base station transmits an RRC connection reconfiguration message to the UE.

In S402, the UE receives the RRC connection reconfiguration message and establishes a DRB, wherein the RRC connection reconfiguration message may contain second indication information configured to indicate whether the DRB includes an SDAP header.

It is to be noted that the RRC connection reconfiguration message may also not contain the second indication information. The second indication information may indicate whether at least one of DL data and UL data of the DRB includes an SDAP header.

In S403, if the RRC connection reconfiguration message contains the second indication information, the UE confirms according to the second indication information that a received SDAP PDU includes or does not include an SDAP header, and an SDAP layer adds or does not add the SDAP header when submitting data to the DRB to a PDCP layer.

In the embodiment, the UE, responsive to a determination according to the second indication information that the DL data of the DRB does not include the SDAP header, confirm that the received SDAP PDU does not include the SDAP header, and responsive to a determination according to the second indication information that the DL data of the DRB includes the SDAP header, confirms that the received SDAP PDU includes the SDAP header; and responsive to a determination according to the second indication information that the UL data of the DRB does not include the SDAP header, the SDAP layer of the UE does not add the SDAP header when submitting the data mapped to the DRB to the PDCP layer, and responsive to a determination according to the second indication information that the UL data of the DRB includes the SDAP header, the SDAP layer adds the SDAP header when submitting the data mapped to the DRB to the PDCP layer.

In S404, if the RRC connection reconfiguration message does not contain the second indication information, the UE adopts default configuration information, confirms according to the default configuration information that the received SDAP PDU includes or does not include the SDAP header, and the SDAP layer adds or does not add the SDAP header when submitting the data to the DRB to the PDCP layer.

In the embodiment, the UE, responsive to a determination according to the default configuration information that the DL data of the DRB does not include the SDAP header, confirm that the received SDAP PDU does not include the SDAP header, and responsive to a determination according to the default configuration information that the DL data of the DRB includes the SDAP header, confirms that the received SDAP PDU includes the SDAP header; and responsive to a determination according to the default configuration information that the UL data of the DRB does not include the SDAP header, the SDAP layer of the UE does not add the SDAP header when submitting the data mapped to the DRB to the PDCP layer, and responsive to a determination according to the default configuration information that the UL data of the DRB includes the SDAP header, the SDAP layer adds the SDAP header when submitting the data mapped to the DRB to the PDCP layer.

In S405, the base station transmits an RRC configuration message to the UE, the RRC connection reconfiguration message being used to perform reconfiguration as to whether at least one of DL data and UL data of the DRB includes an SDAP header.

Performing reconfiguration as to whether the DRB includes the SDAP header refers to that: if the DRB does not include the SDAP header before reconfiguration, the DRB includes the SDAP header after reconfiguration, and if the DRB includes the SDAP header before reconfiguration, the DRB does not include the SDAP header after reconfiguration.

In S406, if the RRC connection reconfiguration message is used to perform reconfiguration as to whether the DL data of the DRB includes the SDAP header, the base station may transmit first indication information to the UE through the RRC connection reconfiguration message, another RRC message or a MAC CE, the first indication information being configured to indicate an SN, and the SN including an SN of a PDCP packet corresponding to a first SDAP packet transmitted from the base station according to a new configuration of the DRB or an SN of a PDCP packet corresponding to a last SDAP packet transmitted from the base station according to an previous configuration of the DRB.

In S407, the UE receives the first indication information transmitted from the base station and acquires an SN of a PDCP packet corresponding to a received SDAP packet.

In S408, the UE compares the acquired SN and the SN indicated by the first indication information to determine whether the SDAP packet includes an SDAP header.

In S409, if the RRC connection reconfiguration message is used to perform reconfiguration as to whether the UL data of the DRB includes the SDAP header, the UE may transmit first indication information to the base station through an RRC connection reconfiguration complete message, another RRC message or a MAC CE, the first indication information being configured to indicate an SN, and the SN including an SN of a PDCP packet corresponding to a first SDAP packet transmitted from the UE according to the new configuration of the DRB or an SN of a PDCP packet corresponding to a last SDAP packet transmitted from the UE according to the previous configuration of the DRB.

In S410, the base station receives the first indication information transmitted from the UE and acquires an SN of a PDCP packet corresponding to a received SDAP packet.

In S411, the base station compares the acquired SN and the SN indicated by the first indication information to determine whether the SDAP packet includes an SDAP header.

According to the embodiment, through interaction between the base station and the UE, the UE or the base station, when serving as the SDAP receiving end, may determine whether the SDAP packet includes the SDAP header according to the received first indication information. In the implementation manner, the header is not required to contain any additional bit, and thus the header has low overheads.

Figure 5:
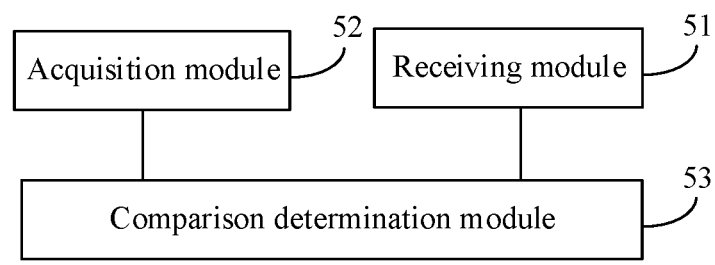
FIG. 5 is a block diagram of a device for configuring reflective QoS, according to an exemplary embodiment.

FIG. 5 is a block diagram of a device for configuring reflective QoS, according to an exemplary embodiment. The device is applied to an SDAP receiving end. As shown in FIG. 5, the device includes a receiving module 51, an acquisition module 52 and a comparison determination module 53.

The receiving module 51 is configured to receive first indication information transmitted from an SDAP transmitting end, the first indication information being configured to indicate an SN, and the SN including an SN of a PDCP packet corresponding to a first SDAP packet transmitted from the SDAP transmitting end according to a new configuration of a pre-established DRB or an SN of a PDCP packet corresponding to a last SDAP packet transmitted from the SDAP transmitting end according to an previous configuration of the pre-established DRB.

The SDAP receiving end may be UE and may also be a base station. Correspondingly, the SDAP transmitting end may be a base station and may also be UE. The new configuration of the DRB refers to whether the DRB includes the SDAP header. For example, if the previous configuration of the DRB is that the DRB does not include the SDAP header, the new configuration of the DRB is that the DRB includes the SDAP header. Similarly, if the previous configuration of the DRB is that the DRB includes the SDAP header, the new configuration of the DRB is that the DRB does not include the SDAP header.

In the embodiment, when the SDAP receiving end is the UE, the SDAP transmitting end is the base station, and the first indication information may be contained in an RRC connection reconfiguration message, another RRC message or MAC CE transmitted from the base station. When the SDAP receiving end is the base station, the SDAP transmitting end is the UE, and the first indication information may be contained in an RRC connection reconfiguration complete message, another RRC message or MAC CE transmitted from the UE.

The acquisition module 52 is configured to acquire an SN of a PDCP packet corresponding to a received SDAP packet.

If the SDAP receiving end is the UE, a PDCP layer of the UE, when receiving the PDCP packet, acquires the SN from a header of the PDCP packet and submits the SDAP packet and the SN of the corresponding PDCP packet to an SDAP layer. Therefore, the UE may acquire the SN of the PDCP packet corresponding to the received SDAP packet.

The comparison determination module 53 is configured to compare the SN acquired by the acquisition module 52 and the SN indicated by the first indication information received by the receiving module 51 to determine whether the SDAP packet includes an SDAP header.

For example, the SN, indicated by the first indication information, of the PDCP packet corresponding to the first SDAP packet transmitted according to the new configuration of the DRB is 15; if the acquired SN of the PDCP packet corresponding to the SDAP packet is 14, it is determined that the received SDAP packet is transmitted according to the previous configuration of the DRB; if the previous configuration of the DRB is that the SDAP header is not included, it is determined that the corresponding SDAP packet does not include the SDAP header; and if the previous configuration of the DRB is that the SDAP header is included, it is determined that the corresponding SDAP packet includes the SDAP header.

For another example, the SN, indicated by the first indication information, of the PDCP packet corresponding to the first SDAP packet transmitted according to the new configuration of the DRB is 15; if the acquired SN of the PDCP packet corresponding to the SDAP packet is 17, it is determined that the received SDAP packet is transmitted according to the new configuration of the DRB; if the new configuration of the DRB is that the SDAP header is not included, it is determined that the corresponding SDAP packet does not include the SDAP header; and if the new configuration of the DRB is that the SDAP header is included, it is determined that the corresponding SDAP packet includes the SDAP header.

According to the embodiment, the first indication information configured to indicate the SN of the PDCP packet corresponding to the first SDAP packet transmitted according to the new configuration of the pre-established DRB or the SN of the PDCP packet corresponding to the last SDAP packet transmitted according to the previous configuration of the pre-established DRB is received from the SDAP transmitting end, the SN of the PDCP packet corresponding to the received SDAP packet is acquired, and then the acquired SN is compared with the SN indicated by the first indication information, so that whether the SDAP packet includes the SDAP header may be determined. In this implementation manner, the header is not required to contain any additional bit, and thus the header has low overheads.

Figure 6:
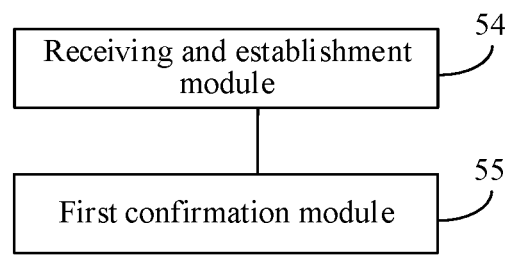
FIG. 6 is a block diagram of another device for configuring reflective QoS, according to an exemplary embodiment.

FIG. 6 is a block diagram of another reflective QoS reconfiguration device, according to an exemplary embodiment. As shown in FIG. 6, based on the embodiment shown in FIG. 5, when the SDAP receiving end is the UE, the device may further include a receiving and establishment module 54 and a first confirmation module 55.

The receiving and establishment module 54 is configured to, before the receiving module 51 receives the first indication information, receive the RRC connection reconfiguration message and establish the DRB.

The first confirmation module 55 is configured to, if the RRC connection reconfiguration message received by the receiving and establishment module 54 contains second indication information configured to indicate whether the DRB includes an SDAP header, responsive to a determination according to the second indication information that the DRB does not include the SDAP header, confirm that a received SDAP PDU does not include an SDAP header, and responsive to a determination according to the second indication information that the DRB includes the SDAP header, confirm that the received SDAP PDU includes the SDAP header.

According to the embodiment, responsive to a determination according to the second indication information that the DRB does not include the SDAP header, it is confirmed that the received SDAP PDU does not include the SDAP header, and responsive to a determination according to the second indication information includes the SDAP header, it is confirmed that the received SDAP PDU includes the SDAP header. The implementation manner is simple.

Figure 7:
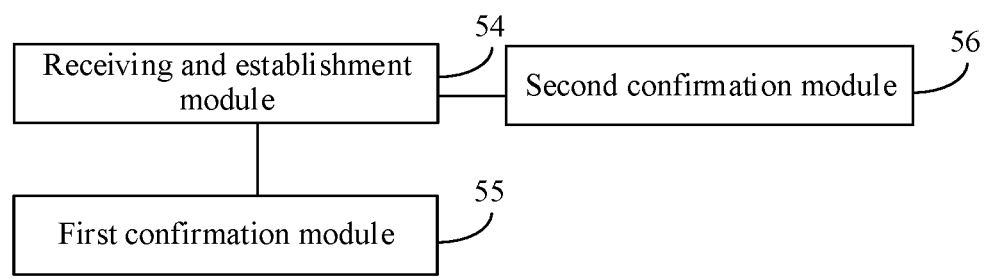
FIG. 7 is a block diagram of another device for configuring reflective QoS, according to an exemplary embodiment.

FIG. 7 is a block diagram of another device for configuring reflective QoS, according to an exemplary embodiment. As shown in FIG. 7, based on the embodiment shown in FIG. 6, the device may further include a second confirmation module 56.

The second confirmation module 56 is configured to, if the RRC connection reconfiguration message received by the receiving and establishment module 54 does not contain the second indication information, adopt default configuration information, responsive to a determination according to the default configuration information that the DRB does not include the SDAP header, confirm that the received SDAP PDU does not include the SDAP header, and responsive to a determination according to the default configuration information that the DRB includes the SDAP header, confirm that the received SDAP PDU includes the SDAP header.

According to the embodiment, when the RRC connection reconfiguration message does not contain the second indication information, the default configuration information is adopted, responsive to a determination according to the default configuration information that the DRB does not include the SDAP header, it is confirmed that the received SDAP PDU does not include the SDAP header, and responsive to a determination according to the default configuration information that the DRB includes the SDAP header, it is confirmed that the received SDAP PDU includes the SDAP header. The implementation manner is simple.

Figure 8:
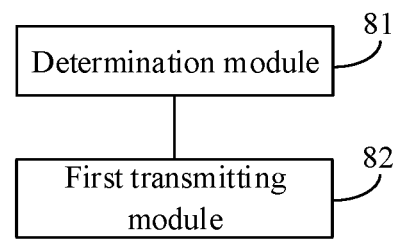
FIG. 8 is a block diagram of a device for transmitting information, according to an exemplary embodiment.

FIG. 8 is a block diagram of a device for transmitting information, according to an exemplary embodiment. The device is applied to an SDAP transmitting end. As shown in FIG. 8, the device includes a determination module 81 and a first transmitting module 82.

The determination module 81 is configured to determine to perform reconfiguration as to whether a pre-established DRB includes an SDAP header.

The SDAP receiving end may be UE and may also be a base station. Correspondingly, the SDAP transmitting end may be a base station and may also be UE.

When the SDAP transmitting end is the base station, if an RRC connection reconfiguration message transmitted from the base station contains an indication of reconfiguring DL data of the DRB, it may be determined to perform reconfiguration as to whether the pre-established DRB includes the SDAP header.

When the SDAP transmitting end is the UE, if an RRC connection reconfiguration message transmitted from the base station contains an indication of reconfiguring UL data of the DRB, it may be determined to perform reconfiguration as to whether the pre-established DRB includes the SDAP header.

The first transmitting module 82 is configured to, after the determination module 81 determine to perform reconfiguration as to whether the pre-established DRB includes the SDAP header, transmit first indication information to an SDAP receiving end, the first indication information being configured to indicate an SN, and the SN including an SN of a PDCP packet corresponding to a first SDAP packet transmitted from the SDAP transmitting end according to a new configuration of the DRB or an SN of a PDCP packet corresponding to a last SDAP packet transmitted from the SDAP transmitting end according to an previous configuration of the DRB, for the SDAP receiving end to determine whether a received SDAP packet includes an SDAP header.

In the embodiment, when the SDAP transmitting end is the base station, the SDAP receiving end is the UE, and the first indication information may be contained in an RRC connection reconfiguration message, another RRC message or MAC CE transmitted from the base station. When the SDAP transmitting end is the UE, the SDAP receiving end is the base station, and the first indication information may be contained in an RRC connection reconfiguration complete message, another RRC message or MAC CE transmitted from the UE.

According to the embodiment, it is determined to perform reconfiguration as to whether the pre-established DRB includes the SDAP header, and the first indication information is transmitted to the SDAP receiving end, so that the UE may determine whether the SDAP packet includes the SDAP header according to the first indication information. In the implementation manner, the header is not required to contain any additional bit, and thus the header has low overheads.

Figure 9:
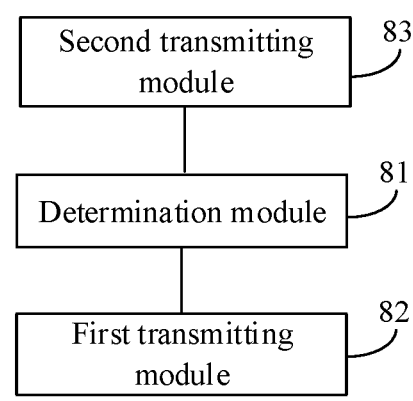
FIG. 9 is a block diagram of another device for transmitting information, according to an exemplary embodiment.

FIG. 9 is a block diagram of another device for transmitting information, according to an exemplary embodiment. As shown in FIG. 9, based on the embodiment shown in FIG. 8, when the SDAP transmitting end is the base station, the device may further include a second transmitting module 83.

The second transmitting module 83 is configured to, before the determination module 81 determines to perform reconfiguration as to whether the pre-established DRB includes the SDAP header, transmit the RRC connection reconfiguration message to the UE for the UE to establish an RRC connection according to the RRC connection reconfiguration message, the RRC connection reconfiguration message containing second indication information configured to indicate whether the DRB includes the SDAP header.

The second indication information may indicate whether at least one of DL data and UL data of the DRB includes an SDAP header.

According to the embodiment, the RRC connection reconfiguration message is transmitted to the UE to enable the UE to establish an RRC connection according to the RRC connection reconfiguration message, and the second indication information configured to indicate whether the DRB includes the SDAP header may be contained through the RRC connection reconfiguration message, so that it is possible to perform reconfiguration as to whether the DRB includes the SDAP header.

Figure 10:
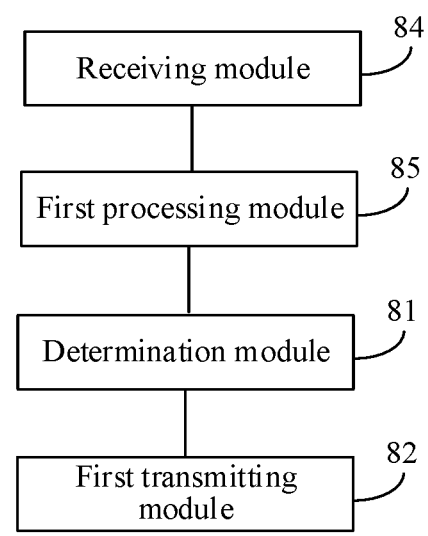
FIG. 10 is a block diagram of another device for transmitting information, according to an exemplary embodiment.

FIG. 10 is a block diagram of another device for transmitting information, according to an exemplary embodiment. As shown in FIG. 10, based on the embodiment shown in FIG. 8, when the SDAP transmitting end is the UE, the device may further include a receiving module 84 and a first processing module 85.

The receiving module 84 is configured to, before the determination module 81 determines to perform reconfiguration as to whether the pre-established DRB includes the SDAP header, receive the RRC connection reconfiguration message transmitted from the base station.

The first processing module 85 is configured to, if the RRC connection reconfiguration message received by the receiving module 84 contains the second indication information configured to indicate whether the DRB includes the SDAP header, responsive to a determination according to the second indication information that the DRB does not include the SDAP header, not add, by an SDAP layer, the SDAP header when submitting data mapped to the DRB to a PDCP layer, and responsive to a determination according to the second indication information that the DRB includes the SDAP header, add, by the SDAP layer, the SDAP header when submitting the data mapped the DRB to the PDCP layer.

According to the embodiment, responsive to a determination according to the second indication information that the DRB does not include the SDAP header, the SDAP layer does not add the SDAP header when submitting the data mapped to the DRB to the PDCP layer, and responsive to a determination according to the second indication information that the DRB includes the SDAP header, the SDAP layer adds the SDAP header when submitting the data mapped the DRB to the PDCP layer. Therefore, there is no influence on data receiving efficiency.

Figure 11:
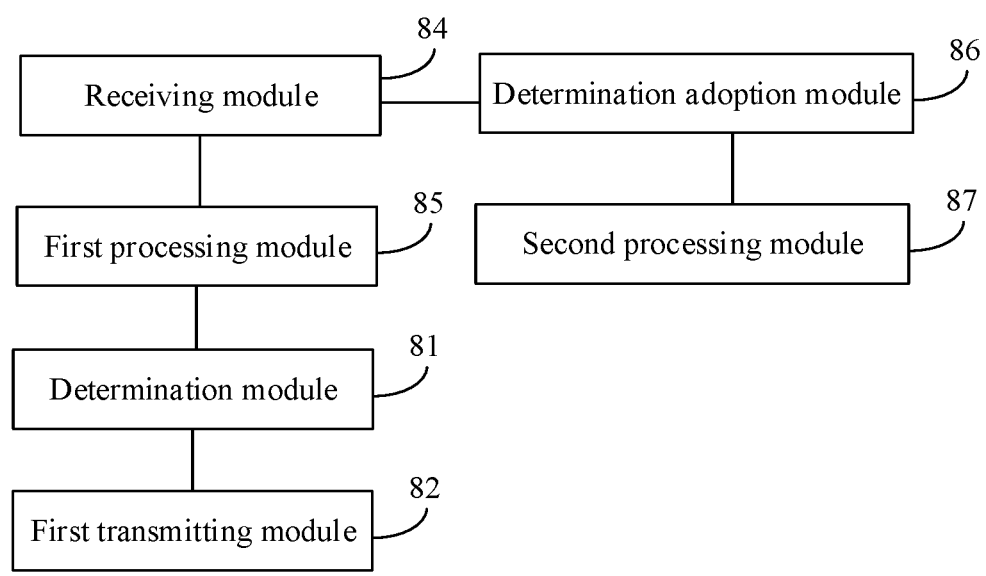
FIG. 11 is a block diagram of another device for transmitting information, according to an exemplary embodiment.

FIG. 11 is a block diagram of another device for transmitting information, according to an exemplary embodiment. As shown in FIG. 11, based on the embodiment shown in FIG. 10, when the SDAP transmitting end is the UE, the device may further include a determination adoption module 86 and a second processing module 87.

The determination adoption module 86 is configured to, if the RRC connection reconfiguration message received by the receiving module 84 does not contain the second indication information configured to indicate whether the DRB includes the SDAP header, adopt default configuration information.

The second processing module 87 is configured to, responsive to a determination according to the default configuration information adopted by the determination adoption module 86 that the DRB does not include the SDAP header, not add, by the SDAP layer, the SDAP header when submitting the data mapped to the DRB to the PDCP layer, and responsive to a determination according to the default configuration information that the DRB includes the SDAP header, add, by the SDAP layer, the SDAP header when submitting the data mapped the DRB to the PDCP layer.

According to the embodiment, when the RRC connection reconfiguration message does not contain the second indication information configured to indicate whether the DRB includes the SDAP header, the default configuration information is adopted, responsive to a determination according to the default configuration information that the DRB does not include the SDAP header, the SDAP layer does not add the SDAP header when submitting the data mapped to the DRB to the PDCP layer, and responsive to a determination according to the default configuration information that the DRB includes the SDAP header, the SDAP layer adds the SDAP header when submitting the data mapped the DRB to the PDCP layer. Therefore, there is no influence on the data receiving efficiency.

Figure 12:
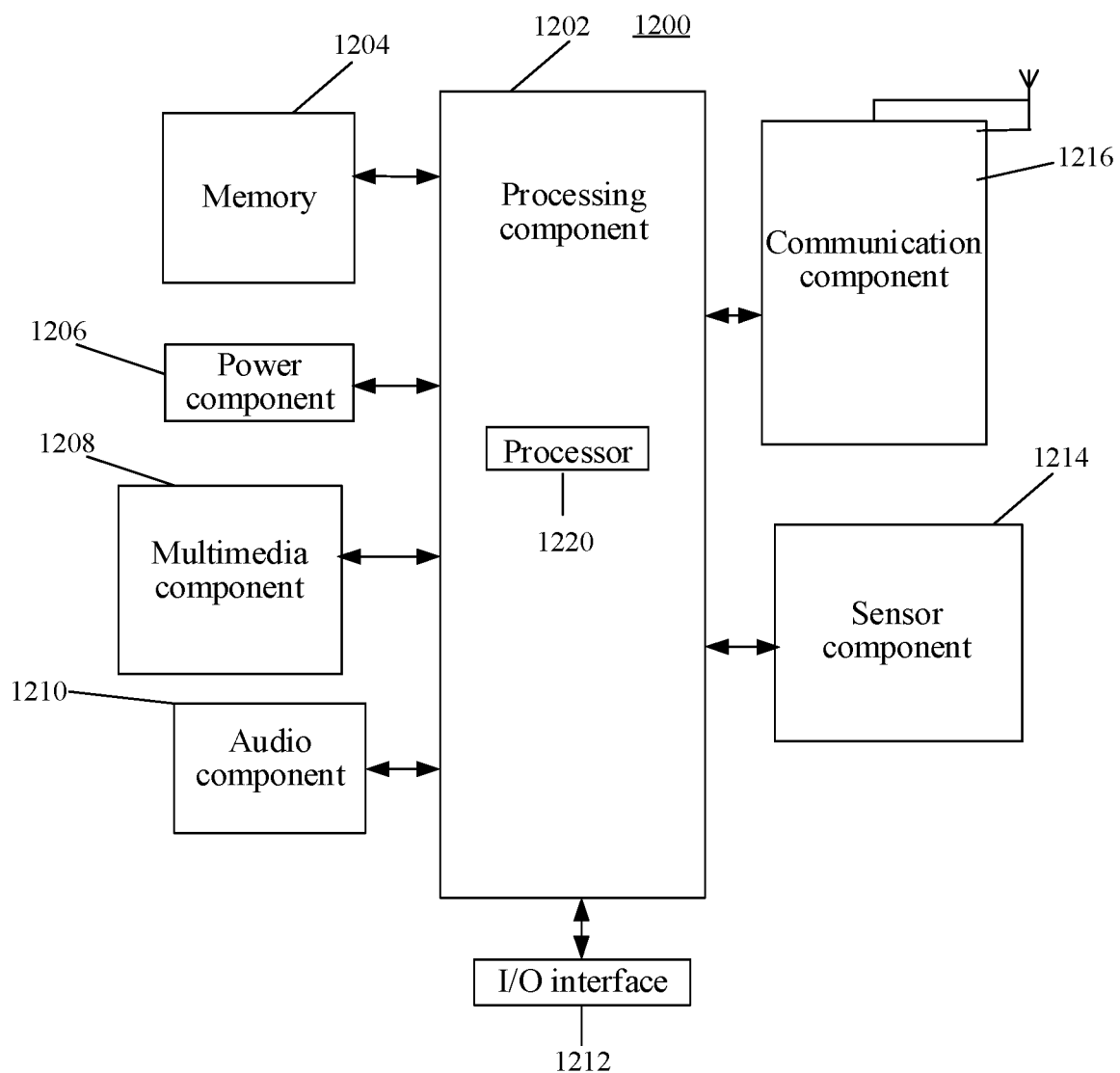
FIG. 12 is a block diagram of a device applied to reflective QoS configuration, according to an exemplary embodiment.

FIG. 12 is a block diagram of a device applied to reflective QoS configuration, according to an exemplary embodiment. For example, the device 1200 may be UE such as a mobile phone, a computer, a digital broadcast terminal, a messaging device, a gaming console, a tablet, a medical device, exercise equipment and a personal digital assistant.

Referring to FIG. 12, the device 1200 may include one or more of the following components: a processing component 1202, a memory 1204, a power component 1206, a multimedia component 1208, an audio component 1210, an Input/Output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the steps in the abovementioned method. Moreover, the processing component 1202 may include one or more modules which facilitate interaction between the processing component 1202 and the other components. For instance, the processing component 1202 may include a multimedia module to facilitate interaction between the multimedia component 1208 and the processing component 1202.

The memory 1204 is configured to store various types of data to support the operation of the device 1200. Examples of such data include instructions for any application programs or methods operated on the device 1200, contact data, phonebook data, messages, pictures, video, etc. The memory 1204 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1206 provides power for various components of the device 1200. The power component 1206 may include a power management system, one or more power supplies, and other components associated with generation, management and distribution of power for the device 1200.

The multimedia component 1208 includes a screen providing an output interface between the device 1200 and a user. In some embodiments, the screen may include a Liquid Crystal Display (LCD) and a Touch Panel (TP). In some embodiments, organic light-emitting diode (OLED) or other types of displays can be employed.

If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1208 includes a front camera and/or a rear camera. The front camera and/or the rear camera may receive external multimedia data when the device 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a Microphone (MIC), and the MIC is configured to receive an external audio signal when the device 1200 is in the operation mode, such as a call mode, a recording mode and a voice recognition mode. The received audio signal may further be stored in the memory 1204 or transmitted through the communication component 1216. In some embodiments, the audio component 1210 further includes a speaker configured to output the audio signal.

The I/O interface 1212 provides an interface between the processing component 1202 and a peripheral interface module, and the peripheral interface module may be a keyboard, a click wheel, a button and the like. The button may include, but not limited to: a home button, a volume button, a starting button and a locking button.

The sensor component 1214 includes one or more sensors configured to provide status assessment in various aspects for the device 1200. For instance, the sensor component 1214 may detect an on/off status of the device 1200 and relative positioning of components, such as a display and small keyboard of the device 1200, and the sensor component 1214 may further detect a change in a position of the device 1200 or a component of the device 1200, presence or absence of contact between the user and the device 1200, orientation or acceleration/deceleration of the device 1200 and a change in temperature of the device 1200. The sensor component 1214 may include a proximity sensor configured to detect presence of an object nearby without any physical contact. The sensor component 1214 may also include a light sensor, such as a Complementary Metal Oxide Semiconductor (CMOS) or Charge Coupled Device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the device 1200 and another device. The device 1200 may access a communication-standard-based wireless network, such as a Wireless Fidelity (Wi-Fi) network, a 2nd-Generation (2G), 3rd-Generation (3G), $4^{th}$-generation (4G), $5^{th}$-generation (5G) network or a combination thereof. In an exemplary embodiment, the communication component 1216 receives a broadcast signal or broadcast associated information from an external broadcast management system through a broadcast channel. In an exemplary embodiment, the communication component 1216 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 1204 including an instruction, and the instruction may be executed by the processor 1220 of the device 1200 to implement the abovementioned method. For example, the non-transitory computer-readable storage medium may be a ROM, a Random-Access Memory (RAM), a Compact Disc Read-Only Memory (CD-ROM), a magnetic tape, a floppy disc, an optical data storage device and the like.

Figure 13:
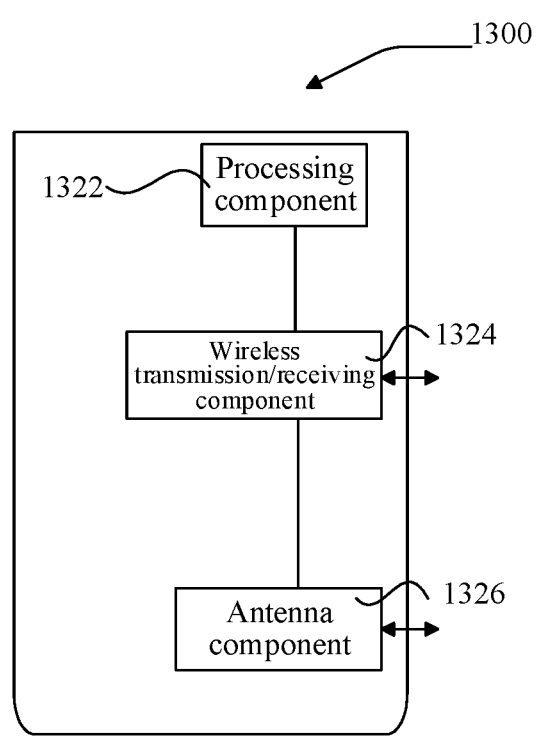
FIG. 13 is a block diagram of another device applied to reflective QoS configuration, according to an exemplary embodiment.

FIG. 13 is a block diagram of another device applied to reflective QoS configuration, according to an exemplary embodiment. The device 1300 may be provided as a base station. Referring to FIG. 13, the device 1300 includes a processing component 1322, a wireless transmission/receiving component 1324, an antenna component 1326 and a wireless interface-specific signal processing part, and the processing component 1322 may further include one or more processors.

One processor in the processing component 1322 may be configured to:

receive first indication information transmitted from an SDAP transmitting end, the first indication information being configured to indicate an SN, and the SN including an SN of a PDCP packet corresponding to a first SDAP packet transmitted from the SDAP transmitting end according to a new configuration of a pre-established DRB or an SN of a PDCP packet corresponding to a last SDAP packet transmitted from the SDAP transmitting end according to an previous configuration of the pre-established DRB;

acquire an SN of a PDCP layer corresponding to a received SDAP packet; and compare the acquired SN and the SN indicated by the first indication information to determine whether the SDAP packet includes an SDAP header.

One processor in the processing component 1322 may also be configured to:

determine to perform reconfiguration as to whether a pre-established DRB includes an SDAP header; and transmit first indication information to an SDAP receiving end, the first indication information being configured to indicate an SN, and the SN including an SN of a PDCP packet corresponding to a first SDAP packet transmitted from an SDAP transmitting end according to a new configuration of the DRB or an SN of a PDCP packet corresponding to a last SDAP packet transmitted from the SDAP transmitting end according to an previous configuration of the DRB, for the SDAP receiving end to determine whether a received SDAP packet includes an SDAP header.

In an exemplary embodiment, there is also provided a non-transitory computer-readable storage medium including an instruction, and the instruction may be executed by the processing component 1322 of the device 1300 to implement the method for configuring reflective QoS or the method for transmitting information. For example, the non-transitory computer-readable storage medium may be a ROM, a RAM, a CD-ROM, a magnetic tape, a floppy disc, an optical data storage device and the like.

The device embodiments substantially correspond to the method embodiments, and thus related parts refer to part of descriptions of the method embodiments. The device embodiment described above is only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the embodiments. Those of ordinary skill in the art may understand and implement without creative work.

The present application discloses a method and device for configuring reflective QoS, a method and device for transmitting information, UE, a base station and a computer-readable storage medium, to enable a receiving end to determine whether received data includes a header and ensure a low header overhead.

According to a first aspect of embodiments of the present disclosure, a method for configuring reflective QoS is provided, which may be applied to an SDAP receiving end, the method including:

first indication information transmitted from an SDAP transmitting end is received, the first indication information being configured to indicate a Sequence Number (SN), and the SN including an SN of a PDCP packet corresponding to a first SDAP packet transmitted from the SDAP transmitting end according to a new configuration of a pre-established DRB or an SN of a PDCP packet corresponding to a last SDAP packet transmitted from the SDAP transmitting end according to an previous configuration of the pre-established DRB;

an SN of a PDCP layer corresponding to a received SDAP packet is acquired; and the acquired SN is compared with the SN indicated by the first indication information to determine whether the SDAP packet includes an SDAP header.

In an embodiment, when the SDAP receiving end is UE, the SDAP transmitting end may be a base station, and the first indication information may be contained in a Radio Resource Control (RRC) connection reconfiguration message, another RRC message or Media Access Control (MAC) Control Element (CE) transmitted from the base station; and when the SDAP receiving end is a base station, the SDAP transmitting end may be UE, and the first indication information may be contained in an RRC connection reconfiguration complete message, another RRC message or MAC CE transmitted from the UE.

In an embodiment, when the SDAP receiving end is the UE, the method may further include that:

before the first indication information is received, the RRC connection reconfiguration message is received, and the DRB is established; and if the RRC connection reconfiguration message contains second indication information configured to indicate whether the DRB includes an SDAP header, responsive to a determination according to the second indication information that the DRB does not include the SDAP header, it is confirmed that a received SDAP PDU does not include an SDAP header, and responsive to a determination according to the second indication information that the DRB includes the SDAP header, it is confirmed that the received SDAP PDU includes the SDAP header.

In an embodiment, the method may further include that:

if the RRC connection reconfiguration message does not contain the second indication information, default configuration information is adopted, responsive to a determination according to the default configuration information that the DRB does not include the SDAP header, it is confirmed that the received SDAP PDU does not include the SDAP header, and responsive to a determination according to the default configuration information that the DRB includes the SDAP header, it is confirmed that the received SDAP PDU includes the SDAP header.

According to a second aspect of the embodiments of the present disclosure, a method for transmitting information is provided, which may be applied to an SDAP transmitting end, the method including:

it is determined to perform reconfiguration as to whether a pre-established DRB includes an SDAP header; and first indication information is transmitted to an SDAP receiving end, the first indication information being configured to indicate an SN, and the SN including an SN of a PDCP packet corresponding to a first SDAP packet transmitted from the SDAP transmitting end according to a new configuration of the DRB or an SN of a PDCP packet corresponding to a last SDAP packet transmitted from the SDAP transmitting end according to an previous configuration of the DRB, for the SDAP receiving end to determine whether a received SDAP packet includes an SDAP header.

In an embodiment, when the SDAP transmitting end is a base station, the SDAP receiving end may be UE, and the first indication information may be contained in an RRC connection reconfiguration message, another RRC message or MAC CE transmitted from the base station; and when the SDAP transmitting end is UE, the SDAP receiving end may be a base station, and the first indication information may be contained in an RRC connection reconfiguration complete message, another RRC message or MAC CE transmitted from the UE.

In an embodiment, when the SDAP transmitting end is the base station, the operation that it is determined to perform reconfiguration as to whether the pre-established DRB includes the SDAP header may include that:

if the RRC connection reconfiguration message transmitted from the base station contains an indication of reconfiguring DL data of the DRB, it is determined to perform reconfiguration as to whether the pre-established DRB includes the SDAP header; and when the SDAP transmitting end is the UE, the operation that it is determined to perform reconfiguration as to whether the pre-established DRB includes the SDAP header may include that:

if the RRC connection reconfiguration message transmitted from the base station contains an indication of reconfiguring UL data of the DRB, it is determined to perform reconfiguration as to whether the pre-established DRB includes the SDAP header.

In an embodiment, when the SDAP transmitting end is the base station, the method may further include that:

before it is determined to perform reconfiguration as to whether the pre-established DRB includes the SDAP header, the RRC connection reconfiguration message is transmitted to the UE for the UE to establish an RRC connection according to the RRC connection reconfiguration message, the RRC connection reconfiguration message containing second indication information configured to indicate whether the DRB includes the SDAP header.

In an embodiment, when the SDAP transmitting end is the UE, the method may further include that:

before it is determined to perform reconfiguration as to whether the pre-established DRB includes the SDAP header, the RRC connection reconfiguration message transmitted from the base station is received; and if the RRC connection reconfiguration message contains the second indication information configured to indicate whether the DRB includes the SDAP header, responsive to a determination according to the second indication information that the DRB does not include the SDAP header, an SDAP layer does not add the SDAP header when submitting data mapped to the DRB to a PDCP layer, and responsive to a determination according to the second indication information that the DRB includes the SDAP header, the SDAP layer adds the SDAP header when submitting the data mapped the DRB to the PDCP layer.

In an embodiment, the method may further include that:

if the RRC connection reconfiguration message does not contain the second indication information configured to indicate whether the DRB includes the SDAP header, default configuration information is adopted; and responsive to a determination according to the default configuration information that the DRB does not include the SDAP header, the SDAP layer does not add the SDAP header when submitting the data mapped to the DRB to the PDCP layer, and responsive to a determination according to the default configuration information that the DRB includes the SDAP header, the SDAP layer adds the SDAP header when submitting the data mapped the DRB to the PDCP layer.

According to a third aspect of embodiments of the present disclosure, a device for configuring reflective QoS is provided, which may be applied to an SDAP receiving end, the device including:

a receiving module, configured to receive first indication information transmitted from an SDAP transmitting end, the first indication information being configured to indicate an SN, and the SN including an SN of a PDCP packet corresponding to a first SDAP packet transmitted from the SDAP transmitting end according to a new configuration of a pre-established DRB or an SN of a PDCP packet corresponding to a last SDAP packet transmitted from the SDAP transmitting end according to an previous configuration of the pre-established DRB;

an acquisition module, configured to acquire an SN of a PDCP packet corresponding to a received SDAP packet; and a comparison determination module, configured to compare the SN acquired by the acquisition module and the SN indicated by the first indication information received by the receiving module to determine whether the SDAP packet includes an SDAP header.

In an embodiment, when the SDAP receiving end is UE, the SDAP transmitting end may be a base station, and the first indication information may be contained in an RRC connection reconfiguration message, another RRC message or MAC CE transmitted from the base station; and when the SDAP receiving end is a base station, the SDAP transmitting end may be UE, and the first indication information may be contained in an RRC connection reconfiguration complete message, another RRC message or MAC CE transmitted from the UE.

In an embodiment, when the SDAP receiving end is the UE, the device may further include:

a receiving and establishment module, configured to, before the receiving module receives the first indication information, receive the RRC connection reconfiguration message and establish the DRB; and a first confirmation module, configured to, if the RRC connection reconfiguration message received by the receiving and establishment module contains second indication information configured to indicate whether the DRB includes an SDAP header, responsive to a determination according to the second indication information that the DRB does not include the SDAP header, confirm that a received SDAP PDU does not include an SDAP header, and responsive to a determination according to the second indication information that the DRB includes the SDAP header, confirm that the received SDAP PDU includes the SDAP header.

In an embodiment, the device may further include:

a second confirmation module, configured to, if the RRC connection reconfiguration message received by the receiving and establishment module does not contain the second indication information, adopt default configuration information, responsive to a determination according to the default configuration information that the DRB does not include the SDAP header, confirm that the received SDAP PDU does not include the SDAP header, and responsive to a determination according to the default configuration information that the DRB includes the SDAP header, confirm that the received SDAP PDU includes the SDAP header.

According to a fourth aspect of the embodiments of the present disclosure, a device for transmitting information is provided, which may be applied to an SDAP transmitting end, the device including:

a determination module, configured to determine to perform reconfiguration as to whether a pre-established DRB includes an SDAP header; and a transmitting module, configured to, after the determination module determine to perform reconfiguration as to whether the pre-established DRB includes the SDAP header, transmit first indication information to an SDAP receiving end, the first indication information being configured to indicate an SN, and the SN including an SN of a PDCP packet corresponding to a first SDAP packet transmitted from the SDAP transmitting end according to a new configuration of the DRB or an SN of a PDCP packet corresponding to a last SDAP packet transmitted from the SDAP transmitting end according to an previous configuration of the DRB, for the SDAP receiving end to determine whether a received SDAP packet includes an SDAP header.

In an embodiment, when the SDAP transmitting end is a base station, the SDAP receiving end may be UE, and the first indication information may be contained in an RRC connection reconfiguration message, another RRC message or MAC CE transmitted from the base station; and when the SDAP transmitting end is UE, the SDAP receiving end may be a base station, and the first indication information may be contained in an RRC connection reconfiguration complete message, another RRC message or MAC CE transmitted from the UE.

In an embodiment, when the SDAP transmitting end is the base station, the determination module may be configured to, if the RRC connection reconfiguration message transmitted from the base station contains an indication of reconfiguring DL data of the DRB, determine to perform reconfiguration as to whether the pre-established DRB includes the SDAP header; and when the SDAP transmitting end is the UE, the determination module may be configured to, if the RRC connection reconfiguration message transmitted from the base station contains an indication of reconfiguring UL data of the DRB, determine to perform reconfiguration as to whether the pre-established DRB includes the SDAP header.

In an embodiment, when the SDAP transmitting end is the base station, the device may further include:

the transmitting module, configured to, before the determination module determines to perform reconfiguration as to whether the pre-established DRB includes the SDAP header, transmit the RRC connection reconfiguration message to the UE for the UE to establish an RRC connection according to the RRC connection reconfiguration message, the RRC connection reconfiguration message containing second indication information configured to indicate whether the DRB includes the SDAP header.

In an embodiment, when the SDAP transmitting end is the UE, the device may further include:

a receiving module, configured to, before the determination module determines to perform reconfiguration as to whether the pre-established DRB includes the SDAP header, receive the RRC connection reconfiguration message transmitted from the base station; and a first processing module, configured to, if the RRC connection reconfiguration message received by the receiving module contains the second indication information configured to indicate whether the DRB includes the SDAP header, responsive to a determination according to the second indication information that the DRB does not include the SDAP header, not add, by an SDAP layer, the SDAP header when submitting data mapped to the DRB to a PDCP layer, and responsive to a determination according to the second indication information that the DRB includes the SDAP header, add, by the SDAP layer, the SDAP header when submitting the data mapped the DRB to the PDCP layer.

In an embodiment, the device may further include:

a determination adoption module, configured to, if the RRC connection reconfiguration message received by the receiving module does not contain the second indication information configured to indicate whether the DRB includes the SDAP header, adopt default configuration information; and a second processing module, configured to, responsive to a determination according to the default configuration information adopted by the determination adoption module that the DRB does not include the SDAP header, not add, by the SDAP layer, the SDAP header when submitting the data mapped to the DRB to the PDCP layer, and responsive to a determination according to the default configuration information that the DRB includes the SDAP header, add, by the SDAP layer, the SDAP header when submitting the data mapped the DRB to the PDCP layer.

According to a fifth aspect of the embodiments of the present disclosure, a receiving end device is provided, which may include:

a processor; and a memory configured to store instructions executable by the processor, wherein the processor may be configured to:

receive first indication information transmitted from an SDAP transmitting end, the first indication information being configured to indicate an SN, and the SN including an SN of a PDCP packet corresponding to a first SDAP packet transmitted from the SDAP transmitting end according to a new configuration of a pre-established DRB or an SN of a PDCP packet corresponding to a last SDAP packet transmitted from the SDAP transmitting end according to an previous configuration of the pre-established DRB;

acquire an SN of a PDCP layer corresponding to a received SDAP packet; and compare the acquired SN and the SN indicated by the first indication information to determine whether the SDAP packet includes an SDAP header.

According to a sixth aspect of the embodiments of the present disclosure, a transmitting end device is provided, which may include:

a processor; and a memory configured to store instructions executable by the processor, wherein the processor may be configured to:

determine to perform reconfiguration as to whether a pre-established DRB includes an SDAP header; and transmit first indication information to an SDAP receiving end, the first indication information being configured to indicate an SN, and the SN including an SN of a PDCP packet corresponding to a first SDAP packet transmitted from an SDAP transmitting end according to a new configuration of the DRB or an SN of a PDCP packet corresponding to a last SDAP packet transmitted from the SDAP transmitting end according to an previous configuration of the DRB, for the SDAP receiving end to determine whether a received SDAP packet includes an SDAP header.

According to a seventh aspect of the embodiments of the present disclosure, there is provided a computer-readable storage medium having stored thereon a computer program that, when executed by a processor, implements the steps of the method for configuring reflective QoS.

According to an eighth aspect of the embodiments of the present disclosure, there is provided a computer-readable storage medium having stored thereon a computer program that, when executed by a processor, implements the steps of the method for transmitting information.

Various embodiments of the present disclosure can have one or more of the following advantages.

The first indication information, configured to indicate the SN of the PDCP packet corresponding to the first SDAP packet transmitted according to the new configuration of the pre-established DRB or the SN of the PDCP packet corresponding to the last SDAP packet transmitted according to the previous configuration of the pre-established DRB, is received from the SDAP transmitting end, the SN of the PDCP packet corresponding to the received SDAP packet is acquired, and then the acquired SN is compared with the SN indicated by the first indication information, so that whether the SDAP packet includes the SDAP header may be determined. In this implementation manner, the header is not required to contain any additional bit, and thus the header has low overheads.

When the SDAP receiving end is the UE and the SDAP transmitting end is the base station, multiple manners are provided for transmitting the first indication information by configuring the first indication information to be contained in the RRC connection reconfiguration message, other RRC message or MAC CE transmitted from the base station; and when the SDAP receiving end is the base station and the SDAP transmitting end is the UE, multiple manners are provided for transmitting the first indication information by configuring the first indication information to be contained in the RRC connection reconfiguration complete message, other RRC message or MAC CE transmitted from the UE.

Responsive to a determination according to the second indication information that the DRB does not include the SDAP header, it is confirmed that the received SDAP PDU does not include the SDAP header, and responsive to a determination according to the second indication information includes the SDAP header, it is confirmed that the received SDAP PDU includes the SDAP header. The implementation manner is simple.

When the RRC connection reconfiguration message does not contain the second indication information, the default configuration information is adopted, responsive to a determination according to the default configuration information that the DRB does not include the SDAP header, it is confirmed that the received SDAP PDU does not include the SDAP header, and responsive to a determination according to the default configuration information that the DRB includes the SDAP header, it is confirmed that the received SDAP PDU includes the SDAP header. The implementation manner is simple.

It is determined to perform reconfiguration as to whether the pre-established DRB includes the SDAP header, and the first indication information is transmitted to the SDAP receiving end, so that the UE may determine whether the SDAP packet includes the SDAP header according to the first indication information. In the implementation manner, the header is not required to contain any additional bit, and the header overhead is low.

When the SDAP transmitting end is the base station and the SDAP receiving end is the UE, multiple manners are provided for transmitting the first indication information by configuring the first indication information to be contained in the RRC connection reconfiguration message, other RRC message or MAC CE transmitted from the base station; and when the SDAP transmitting end is the UE and the SDAP receiving end is the base station, multiple manners are provided for transmitting the first indication information by configuring the first indication information to be contained in the RRC connection reconfiguration complete message, other RRC message or MAC CE transmitted from the UE.

When the SDAP transmitting end is the base station, if the RRC connection reconfiguration message transmitted from the base station contains the indication of reconfiguring the DL data of the DRB, it is determined to perform reconfiguration as to whether the pre-established DRB includes the SDAP header; and when the SDAP transmitting end is the UE, if the RRC connection reconfiguration message transmitted from the base station contains the indication of reconfiguring the UL data of the DRB, it is determined to perform reconfiguration as to whether the pre-established DRB includes the SDAP header. The implementation manner is simple.

The RRC connection reconfiguration message is transmitted to the UE to enable the UE to establish an RRC connection according to the RRC connection reconfiguration message, and the second indication information configured to indicate whether the DRB includes the SDAP header may be contained through the RRC connection reconfiguration message, so that it is possible to perform reconfiguration as to whether the DRB includes the SDAP header.

Responsive to a determination according to the second indication information that the DRB does not include the SDAP header, the SDAP layer does not add the SDAP header when submitting the data mapped to the DRB to the PDCP layer, and responsive to a determination according to the second indication information that the DRB includes the SDAP header, the SDAP layer adds the SDAP header when submitting the data mapped the DRB to the PDCP layer. Therefore, there is no influence on data receiving efficiency.

When the RRC connection reconfiguration message does not contain the second indication information configured to indicate whether the DRB includes the SDAP header, the default configuration information is adopted, responsive to a determination according to the default configuration information that the DRB does not include the SDAP header, the SDAP layer does not add the SDAP header when submitting the data mapped to the DRB to the PDCP layer, and responsive to a determination according to the default configuration information that the DRB includes the SDAP header, the SDAP layer adds the SDAP header when submitting the data mapped the DRB to the PDCP layer. Therefore, there is no influence on the data receiving efficiency.

It is to be noted that relational terms "first," "second" and the like in the present disclosure are adopted only to distinguish one entity or operation from another entity or operation and not always to require or imply existence of any such practical relationship or sequence between the entities or operations. Terms "include" and "have" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an . . . ," does not exclude existence of another element that is the same in a process, method, object or device including the element.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Terms used in the present disclosure are only adopted for the purpose of describing specific embodiments but not intended to limit the present disclosure. "A/an," "said" and "the" in a singular form in the present disclosure and the appended claims are also intended to include a plural form, unless other meanings are clearly denoted throughout the present disclosure.

It is to be understood that terms such as "a/an" do not represent a number limit but represent "at least one." Terms like "include" or "contain" refer to that an element or object appearing before "include" or "contain" covers an element or object and equivalent thereof listed after "include" or "contain" and does not exclude another element or object. Similar terms such as "connect" or "interconnect" are not limited to physical or mechanical connection, and may include electrical connection, either direct or indirect.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "I" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for configuring reflective Quality of Service (QoS), applied to a Service Data Adaptation Protocol (SDAP) receiving end, the method comprising:
   receiving first indication information contained in a first Radio Resource Control (RRC) connection reconfiguration message transmitted from an SDAP transmitting end, the first indication information being configured to indicate a Sequence Number (SN), and the SN comprising an SN of a Packet Data Convergence Protocol (PDCP) packet corresponding to a last SDAP packet transmitted from the SDAP transmitting end according to a previous configuration of a pre-established Data Radio Bearer (DRB);
   acquiring an SN of a PDCP packet corresponding to a received SDAP packet;
   comparing the acquired SN and the SN indicated by the first indication information to determine whether the SDAP packet comprises an SDAP header;
   when the SDAP receiving end is User Equipment (UE),
   before receiving the first indication information, receiving a second RRC connection reconfiguration message, and establishing the DRB; and
   responsive to that the second RRC connection reconfiguration message contains second indication information configured to indicate whether the DRB comprises an SDAP header, responsive to a determination according to the second indication information that the DRB does not comprise the SDAP header, confirming that a received SDAP Protocol Data Unit (PDU) does not comprise an SDAP header, and responsive to a determination according to the second indication information that the DRB comprises the SDAP header, confirming that the received SDAP PDU comprises the SDAP header,
   responsive to that the second RRC connection reconfiguration message does not contain the second indication information, adopting default configuration information, and responsive to a determination according to the default configuration information that the DRB does not comprise the SDAP header, confirming that the received SDAP PDU does not comprise the SDAP header, and responsive to a determination according to the default configuration information that the DRB comprises the SDAP header, confirming that the received SDAP PDU comprises the SDAP header.

2. The method of claim 1, wherein
   when the SDAP receiving end is the UE, the SDAP transmitting end is a base station, and the first indication information is further contained in another RRC message or Media Access Control (MAC) Control Element (CE) transmitted from the base station; and
   when the SDAP receiving end is a base station, the SDAP transmitting end is UE, and the first indication information is contained in an RRC connection reconfiguration complete message, another RRC message or MAC CE transmitted from the UE.

3. A method for transmitting information, applied to a Service Data Adaptation Protocol (SDAP) transmitting end, the method comprising:
   determining to perform reconfiguration as to whether a pre-established Data Radio Bearer (DRB) comprises an SDAP header;
   transmitting first indication information contained in a first Radio Resource Control (RRC) connection reconfiguration message to an SDAP receiving end, the first indication information being configured to indicate a Sequence Number (SN), and the SN comprising an SN of a Packet Data Convergence Protocol (PDCP) packet corresponding to a last SDAP packet transmitted from the SDAP transmitting end according to a previous configuration of the Data Radio Bearer (DRB), for the SDAP receiving end to determine whether a received SDAP packet comprises an SDAP header;
   when the SDAP transmitting end is User Equipment (UE), prior to determining to perform reconfiguration as to whether the pre-established DRB comprises the SDAP header, receiving a second RRC connection reconfiguration message transmitted from the base station; and
   responsive to that the second RRC connection reconfiguration message contains second indication information configured to indicate whether the DRB comprises the SDAP header, responsive to a determination according to the second indication information that the DRB does not comprise the SDAP header, not adding, by an SDAP layer, the SDAP header when submitting data mapped to the DRB to a PDCP layer, and responsive to a determination according to the second indication information that the DRB comprises the SDAP header, adding, by the SDAP layer, the SDAP header when submitting the data mapped the DRB to the PDCP layer;
   responsive to that the second RRC connection reconfiguration message does not contain the second indication information configured to indicate whether the DRB comprises the SDAP header, adopting default configuration information,
      responsive to a determination according to the default configuration information that the DRB does not comprise the SDAP header, not adding, by the SDAP layer, the SDAP header when submitting the data mapped to the DRB to the PDCP layer, and responsive to a determination according to the default configuration information that the DRB comprises the SDAP header, adding, by the SDAP layer, the SDAP header when submitting the data mapped the DRB to the PDCP layer.

4. The method of claim 3, wherein
   when the SDAP transmitting end is a base station, the SDAP receiving end is the UE, and the first indication information is further contained in another RRC message or Media Access Control (MAC) Control Element (CE) transmitted from the base station; and
   when the SDAP transmitting end is UE, the SDAP receiving end is a base station, and the first indication information is contained in an RRC connection reconfiguration complete message, another RRC message or MAC CE transmitted from the UE.

5. The method of claim 3, wherein when the SDAP transmitting end is a base station, determining to perform reconfiguration as to whether the pre-established DRB comprises the SDAP header comprises:
   if the first RRC connection reconfiguration message transmitted from the base station contains an indication of reconfiguring Downlink (DL) data of the DRB, determining to perform reconfiguration as to whether the pre-established DRB comprises the SDAP header; and
   when the SDAP transmitting end is UE, determining to perform reconfiguration as to whether the pre-established DRB comprises the SDAP header comprises:
   responsive to that the first RRC connection reconfiguration message transmitted from the base station contains an indication of reconfiguring Uplink (UL) data of the DRB, determining to perform reconfiguration as to whether the pre-established DRB comprises the SDAP header.

6. The method of claim 3, further comprising: when the SDAP transmitting end is a base station,
prior to determining to perform reconfiguration as to whether the pre-established DRB comprises the SDAP header, transmitting the second RRC connection reconfiguration message to the UE for the UE to establish an RRC connection according to the second RRC connection reconfiguration message, the second RRC connection reconfiguration message containing second indication information configured to indicate whether the DRB comprises the SDAP header.

7. A device implementing the method of claim 3, applied to a Service Data Adaptation Protocol (SDAP) transmitting end, the device comprising:
memory storing processor-executable instructions; and
a processor arranged to execute the stored processor-executable instructions to perform operations of the method for transmitting information.

8. The device of claim 7, wherein
when the SDAP transmitting end is a base station, the SDAP receiving end is the UE, and the first indication information is further contained in another RRC message or Media Access Control (MAC) Control Element (CE) transmitted from the base station; and
when the SDAP transmitting end is UE, the SDAP receiving end is a base station, and the first indication information is contained in an RRC connection reconfiguration complete message, another RRC message or MAC CE transmitted from the UE.

9. The device of claim 7, wherein when the SDAP transmitting end is a base station, determining to perform reconfiguration as to whether the pre-established DRB comprises the SDAP header comprises:
responsive to that the first RRC connection reconfiguration message transmitted from the base station contains an indication of reconfiguring Downlink (DL) data of the DRB, determining to perform reconfiguration as to whether the pre-established DRB comprises the SDAP header; and
when the SDAP transmitting end is UE, determining to perform reconfiguration as to whether the pre-established DRB comprises the SDAP header comprises:
responsive to that the first RRC connection reconfiguration message transmitted from the base station contains an indication of reconfiguring Uplink (UL) data of the DRB, determining to perform reconfiguration as to whether the pre-established DRB comprises the SDAP header.

10. The device of claim 7, wherein the processor is arranged to execute the stored processor-executable instructions to further perform an operation of:
prior to determining to perform reconfiguration as to whether the pre-established DRB comprises the SDAP header, transmitting the second RRC connection reconfiguration message to UE for the UE to establish an RRC connection according to the second RRC connection reconfiguration message, the second RRC connection reconfiguration message containing second indication information configured to indicate whether the DRB comprises the SDAP header.

11. A reflective Quality of Service (QoS) configuration device, applied to a Service Data Adaptation Protocol (SDAP) receiving end, the device comprising:
a memory storing processor-executable instructions; and
a processor arranged to execute the stored processor-executable instructions to perform operations of:
receiving first indication information contained in a first Radio Resource Control (RRC) connection reconfiguration message transmitted from an SDAP transmitting end, the first indication information being configured to indicate a Sequence Number (SN), and the SN comprising an SN of a Packet Data Convergence Protocol (PDCP) packet corresponding to a last SDAP packet transmitted from the SDAP transmitting end according to a previous configuration of the pre-established Data Radio Bearer (DRB);
acquiring an SN of a PDCP packet corresponding to a received SDAP packet;
comparing the acquired SN and the SN indicated by the first indication information to determine whether the SDAP packet comprises an SDAP header;
when the SDAP receiving end is User Equipment (UE), before receiving the first indication information, receiving a second RRC connection reconfiguration message and establishing the DRB; and
responsive to that the second RRC connection reconfiguration message contains second indication information configured to indicate whether the DRB comprises an SDAP header, responsive to a determination according to the second indication information that the DRB does not comprise the SDAP header, confirming that a received SDAP Protocol Data Unit (PDU) does not comprise an SDAP header, and responsive to a determination according to the second indication information that the DRB comprises the SDAP header, confirming that the received SDAP PDU comprises the SDAP header;
responsive to that the second RRC connection reconfiguration message does not contain the second indication information, adopting default configuration information, and responsive to a determination according to the default configuration information that the DRB does not comprise the SDAP header, confirming that the received SDAP PDU does not comprise the SDAP header, and responsive to a determination according to the default configuration information that the DRB comprises the SDAP header, confirming that the received SDAP PDU comprises the SDAP header.

12. The device of claim 11, wherein
when the SDAP receiving end is the UE, the SDAP transmitting end is a base station, and the first indication information is further contained in another RRC message or Media Access Control (MAC) Control Element (CE) transmitted from the base station; and
when the SDAP receiving end is a base station, the SDAP transmitting end is UE, and the first indication information is contained in an RRC connection reconfiguration complete message, another RRC message or MAC CE transmitted from the UE.

* * * * *